Figure 1:
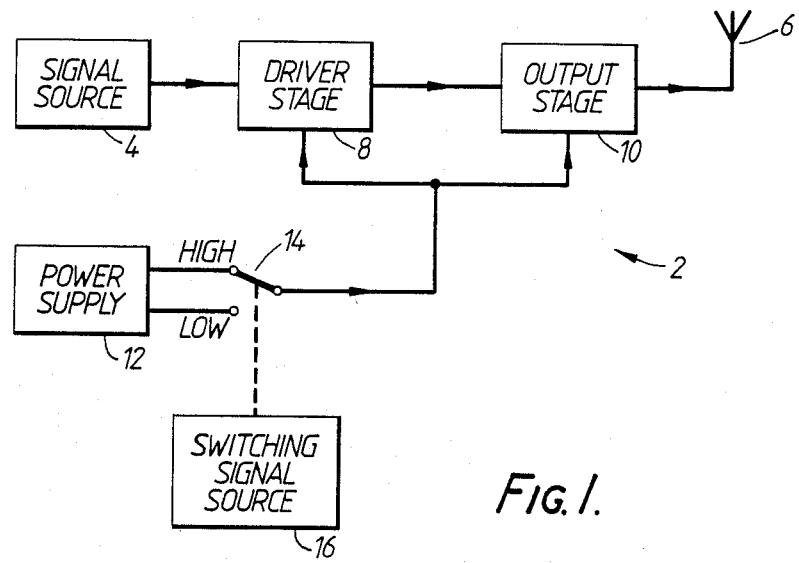

United States Patent [19]

Farrer

[11] Patent Number: 4,731,869
[45] Date of Patent: Mar. 15, 1988

[54] TARGET TRACKING TRANSMITTER HAVING TWO LEVELS OF POWER OPERATION

[75] Inventor: Alan R. K. Farrer, Chichester, Great Britain

[73] Assignee: Plessey Overseas Limited, Ilford, England

[21] Appl. No.: 830,771

[22] Filed: Feb. 18, 1986

[30] Foreign Application Priority Data

Feb. 18, 1985 [GB] United Kingdom ................. 8504135

[51] Int. Cl.⁴ .............................................. H03B 1/04
[52] U.S. Cl. ..................................... 455/127; 455/116
[58] Field of Search .................. 455/127, 116; 375/71; 323/282

[56] References Cited

U.S. PATENT DOCUMENTS 2,844,712  7/1958  Noizzux ............................. 455/127
3,176,229  3/1965  Pierce ................................. 455/127
3,223,915  12/1965  Ryerson et al. ..................... 323/282
3,835,368  9/1974  Williams ............................. 323/282

Primary Examiner—Michael A. Masinick
Attorney, Agent, or Firm—Michael F. Oglo; Julian C. Renfro

[57] ABSTRACT

A target tracking transmitter has an internal voltage supply which may be operated at a first operative level and a second reduced operative level. A switch is provided for cycling the voltage supply between the first and second operative levels, which are both sufficient to ensure generation by the transmitter of radio frequency signals for detection by a remote receiver. The switch is arranged to control the time for which the transmitter is cycled at the first and second levels whereby the operating life of the internal voltage supply is maximized while enabling continuous generation of the radio frequency signals.

5 Claims, 2 Drawing Figures

TARGET TRACKING TRANSMITTER HAVING TWO LEVELS OF POWER OPERATION

The present invention relates to improvements in or relating to radio transmitters and in particular, to radio transmitters designed for target tracking purposes.

Radio transmitters used for target tracking are frequently powered from internal batteries. In order to minimise the physical size of the transmitter small size batteries are desirable. To provide an acceptable life cycle for the transmitter the mean power drain must be commensurate with the energy stored in the batteries. However, to enable an acceptable tracking range for the transmitter the highest possible transmitter power is desirable; which is at conflict with the energy storage capabilities of the relatively small size batteries.

In known target tracking transmitters, this conflict between maximising both the tracking range and the battery life has been compromised by pulsing the transmitter between on and off cycles. In a target tracking radio transmitter the on-off pulsing technique has two particular disadvantages.

Firstly, no target tracking signal is available during the 'off' periods, which can impair tracking performance. Secondly, the dynamic range of the received signal can be very large between the 'on' and 'off' states of the transmitter Which can cause transient overload in receivers having relatively slow response rates.

It is as object of the present invention to provide a target tracking transmitter in which the voltage source is cycled between a "maximum power" state and a "reduced power" state thereby enabling break free transmission during tracking operations and reducing the possibility of transient overloads in the receiver to a minimum.

Accordingly, there is provided a target tracking transmitter for operation from an internal voltage supply, the transmitter comprising switching means for cycling the voltage supply between a first operative voltage level and a second reduced operative voltage level.

Preferably, the first operative voltage level is the maximum voltage level of the voltage supply.

The switching means may be arranged such that the cycles of the voltage supply at the first and second operative voltage levels are adjustable.

The transmitter may be arranged such that the second reduced operative level is adjustable.

Figure 2:
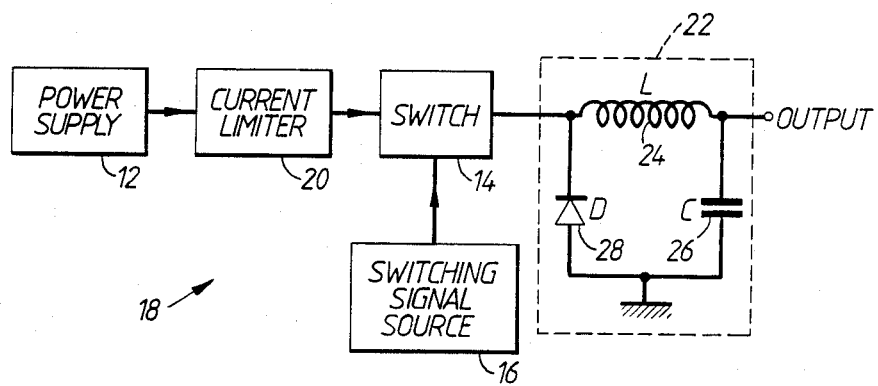

The present invention will now be described, by way of example, with reference to the accompanying drawings in which;

FIG. 1 illustrates a schematic block diagram of a target tracking transmitter in accordance with the present invention and, FIG. 2 illustrates a schematic block diagram of a voltage supply circuit suitable for providing a reduced operative voltage level for the transmitter shown in FIG. 1.

Referring to FIG. 1, a target tracking transmitter 2 comprises a signal source 4, for generating a signal to be transmitted, coupled to an aerial 6 via a driver stage 8 and an output stage 10. The driver stage 8 and output stage 10 operate from a power supply 12, containing an internal power source such as a battery and/or photo-cell array (not shown), via a switch 14. Operation of the switch 14 between high and low positions is controlled by a switching signal source 16.

The transmitter 2 operates so that, during a target tracking operation, the switch 14 may be, for example, cyclically operated between the high and low positions so that the supply to the driver stage 8 and output stage 10 cycles between two operative levels, the first of which may be the maximum level available from the power supply 12 and the second of which is a reduced power level from the power supply 12, the reduced power level being sufficient to enable transmission of a target tracking signal to continue. At the reduced power level the power consumption of the transmitter 2 may be significantly reduced, such as by a factor of 5, but the effective range of the transmitter 2 is reduced by a much smaller factor, such as a factor of 2, due to the progation characteristics of radio signals. The duty ratio, that is, the time at which the transmitter 2 is cycled at the first and second operative voltage levels of the power supply 12, may then be chosen so as to provide the required endurance of the internal power source.

Such an arrangement has considerable advantages over known modes of target tracking transmitter operation.

Firstly, the reduced second operative voltage level is chosen such that there is no break in transmission to cause difficulties during target tracking operations.

Secondly, the available range of operation during the periods of reduced power level is still a large proportion of the maximum transmitter range, as previously mentioned.

Additionally, the dynamic range of any received signal between the two operating states of the transmitter is significantly reduced and causes little, if any, transient overload of the receiver. Furthermore, by varying the ratio between the two operative power levels and the duty ratio of the cyclic operation a wide variety of operational requirements may be satisfied.

The way in which the transmitter power is reduced to the reduced operative level should, preferably, not seriously reduce the efficiency of the transmitter as some of the power savings resulting from operation at the reduced operative level will be lost. However, it should be appreciated that even relatively inefficient methods of power control will provide some advantage over the "on-off" cycle operation of known target tracking transmitters.

Preferably, power control is achieved as shown in FIG. 1 with the driver and output stages 8, 10 of the transmitter 2 being fed from the power supply 12 which can be switched between the full and reduced voltage levels by means of the switch 14. In this manner, the output stages of the transmitter, which normally make the greatest power demands on the internal power source, continue to operate at moderate efficiency. However, the apparatus used to provide the reduced voltage level should also maintain maximum efficiency. This may be achieved by the circuit 18 illustrated in FIG. 2, in which like reference numerals have been used to designate like parts of the transmitter 2 shown in FIG. 1. The circuit 18 includes a current limiter 20, for limiting the current which may be drawn from the power supply 12, coupled between the power supply 12 and the switch 14. A switching regulator 22 is also provided which comprises an inductor 24, resevoir capacitor 26 and a diode 28. In the switching regulator 22 the resevoir capacitor 26 is charged with current pulses via the inductor 24. Between current pulses electrical energy stored in the inductor 24 is transferred to the capacitor 26 via the diode 28, thereby ensuring efficient operation of the regulator 22.

This efficient operation of the regulator 22, in combination with the selectable power level ratios and duty ratios, enables a target tracking transmitter to be achieved having superior internal power source life than known transmitters whilst permitting constant transmission to be maintained during target tracking operations.

Although the present invention has been described with respect to a particular embodiment it should be realised that modifications may be effected within the scope of the invention, such as a user selectable power level ratio and duty cycle, as previously described.

I claim:

1. A target tracking transmitter comprising an internal voltage supply having a first operative level and a second reduced operative level, an output stage coupled to the voltage supply for supplying radio frequency signals for detection by a receiver remote from the target tracking transmitter, and switching means, coupled to the voltage supply, for cycling said supply between the first and second operative levels, said levels both arranged to provide sufficient power to the output stage for enabling continuous transmission of the radio frequency signals, wherein the switching means is arranged to control the time for which the transmitter is cycled at the first and second operative voltage levels whereby the operating life of said voltage supply is maximised whilst enabling continuous transmission of the radio frequency signals throughout the operating life of the voltage supply.

2. A transmitter according to claim 1 wherein the first operative level is the maximum operating level of the voltage supply.

3. A transmitter according to claim 1 wherein the switching means is arranged such that the cycles of the voltage supply at the first and second operative levels are adjustable.

4. A transmitter according to claim 3 wherein the second reduced operative level is adjustable.

5. A transmitter according to claim 4 wherein the switching means comprises a switching regulator for providing the reduced operative level of the voltage supply, the switching regulator comprising a resevoir capacitor, an inductor and a diode arranged to operate such that current pulses from the voltage supply are used to charge the resevoir capacitor via the inductor and, between current pulses, electrical energy stored in the inductor is transferred to the resevoir capacitor via the diode.

* * * * *